Dec. 30, 1930.  J. E. WILLIAMS  1,786,469
NUT FEEDING MECHANISM
Filed Nov. 4, 1927  5 Sheets-Sheet 1

Dec. 30, 1930.  J. E. WILLIAMS  1,786,469
NUT FEEDING MECHANISM
Filed Nov. 4, 1927   5 Sheets-Sheet 3

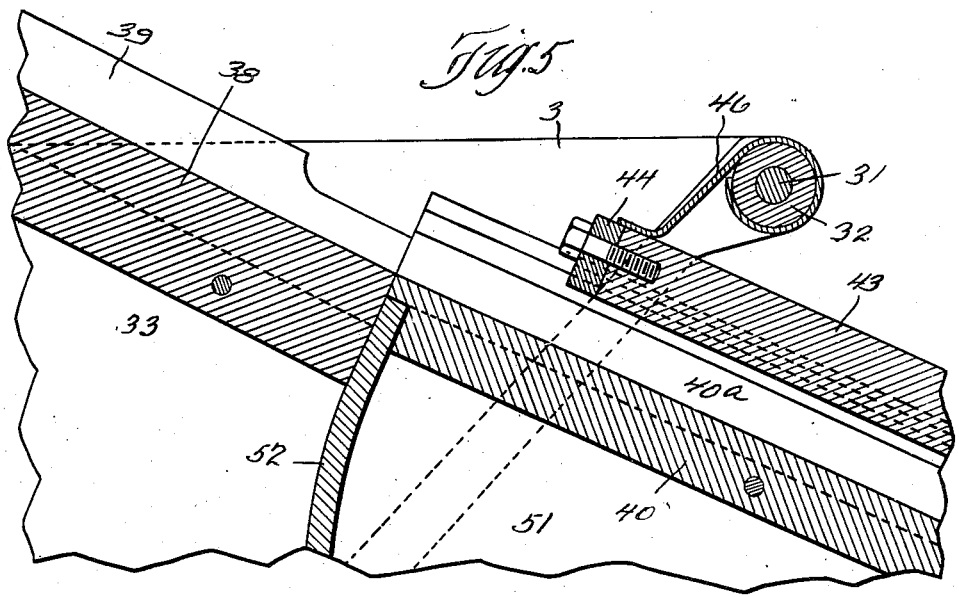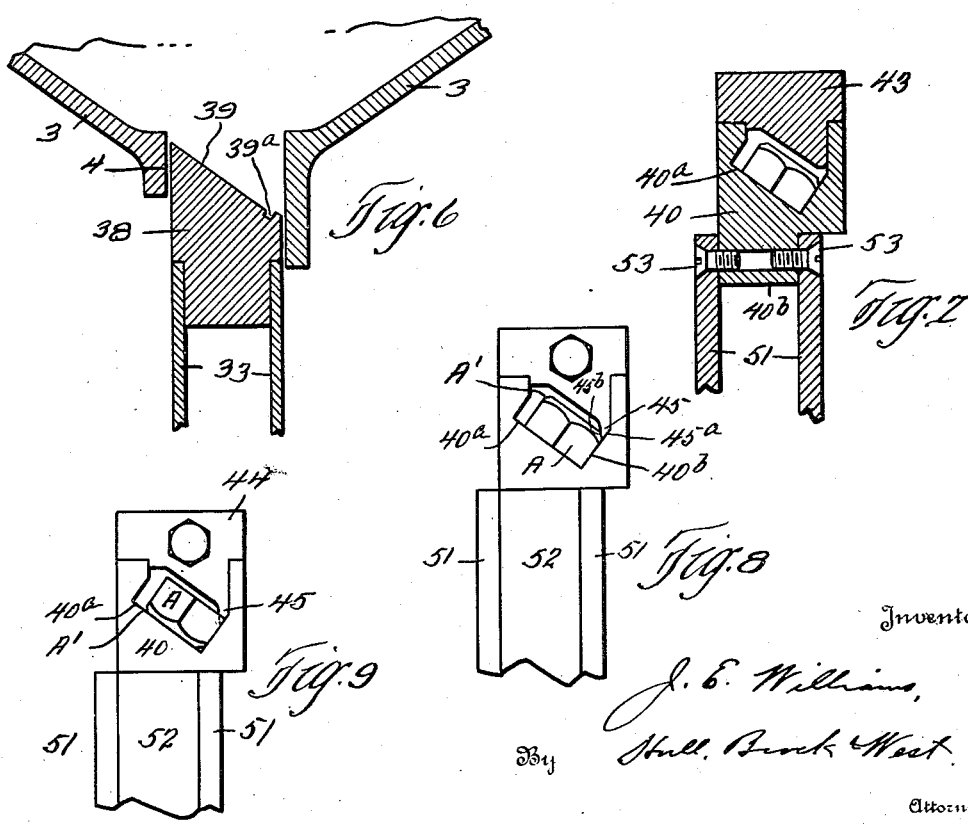

Patented Dec. 30, 1930

1,786,469

UNITED STATES PATENT OFFICE

JULIUS E. WILLIAMS, OF WILLOUGHBY, OHIO, ASSIGNOR, BY MESNE ASSIGNMENTS, TO REPUBLIC STEEL CORPORATION, A CORPORATION OF NEW JERSEY

NUT-FEEDING MECHANISM

Application filed November 4, 1927. Serial No. 231,118.

This invention relates to mechanism for selectively feeding nuts to a finishing machine, the mechanism operating in conjunction with a hopper from which the nuts are so selectively fed to the said machine.

It is the general purpose and object of the invention to provide feeding mechanism of the character referred to which will enable nuts to be fed quickly and automatically in operative relation to the finishing mechanism.

Further and more limited objects of the invention will appear hereinafter in the specification and will be realized by the combination of elements covered by the claims hereof.

Figure 1:
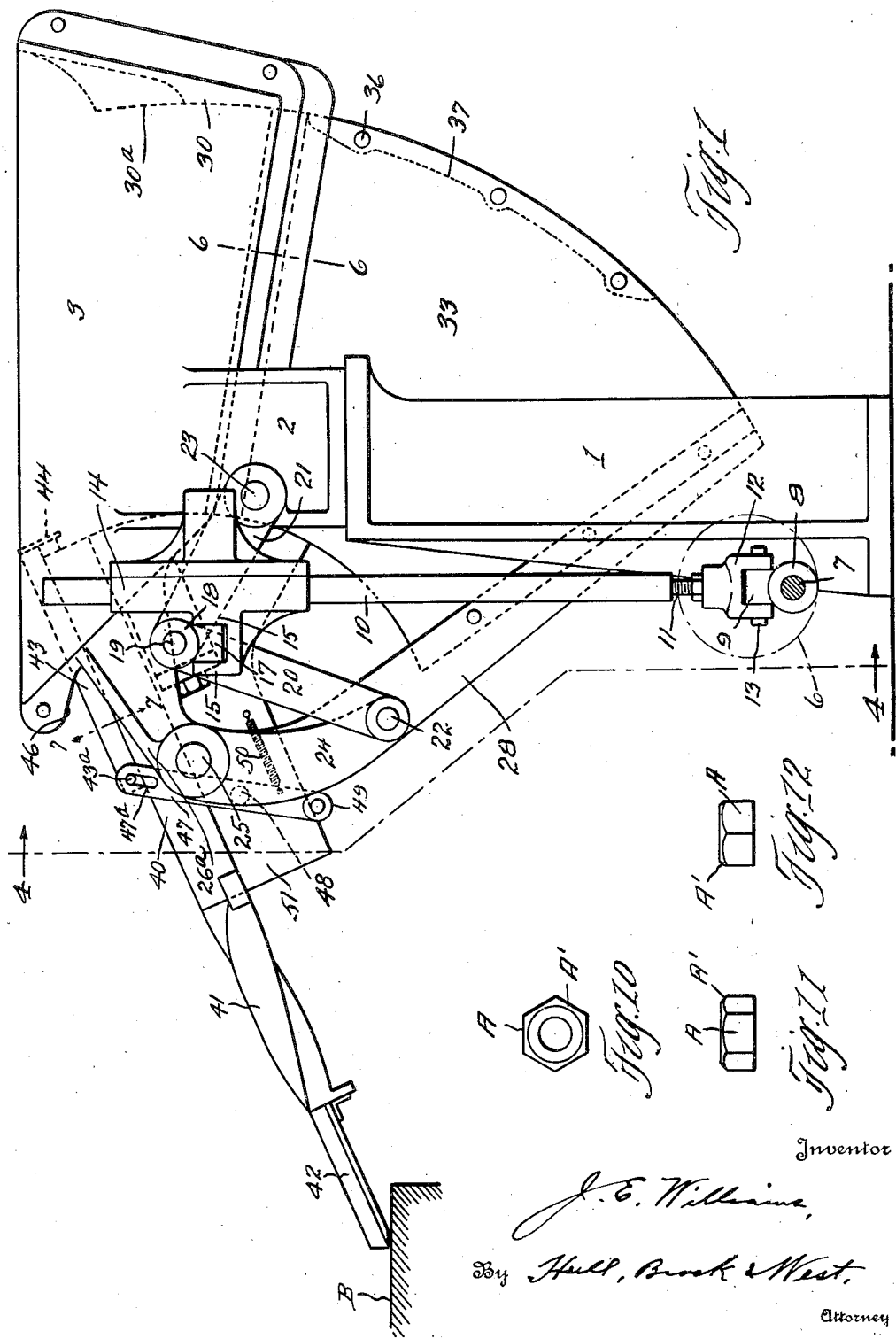
Figure 2:
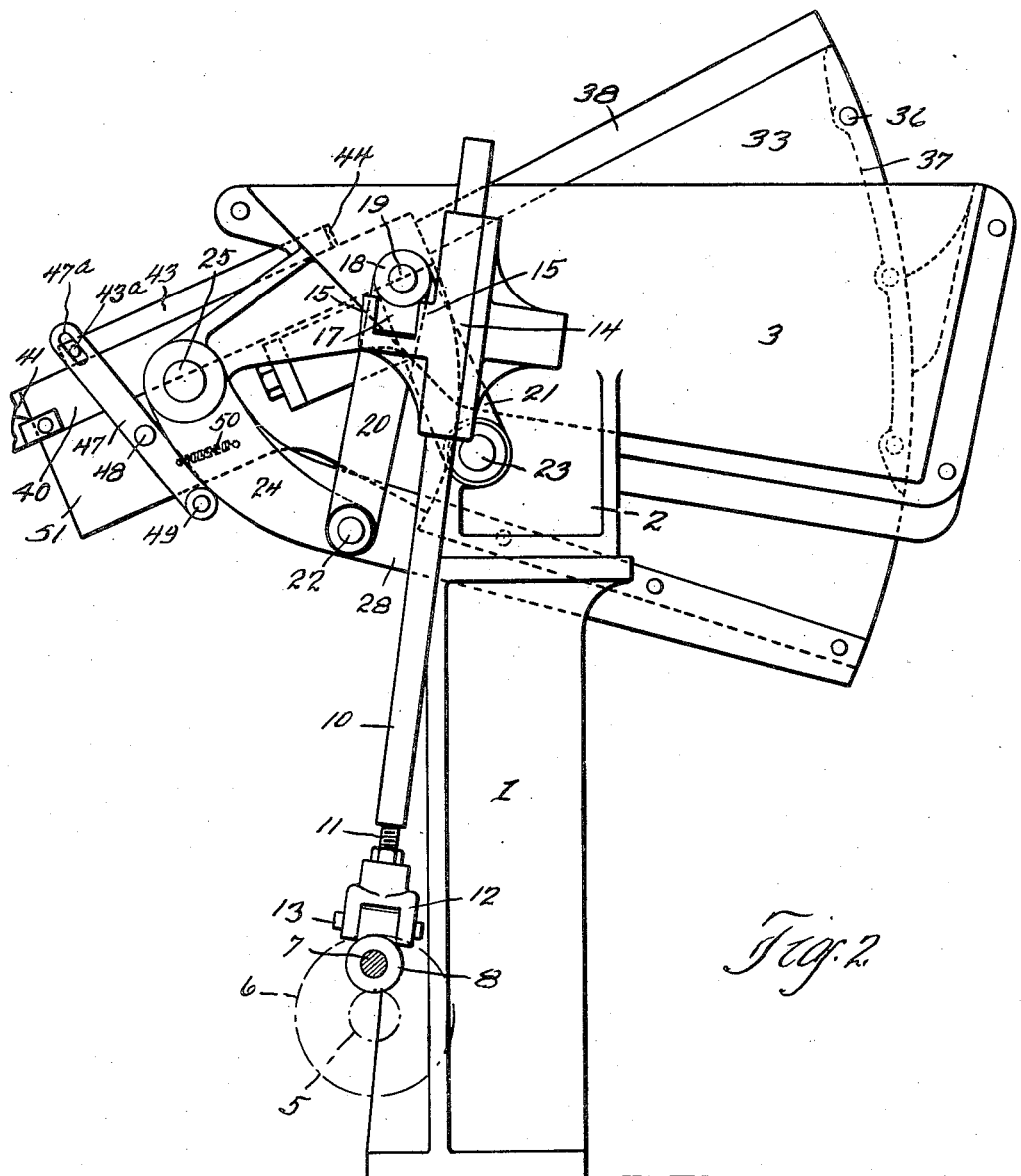
Figure 3:
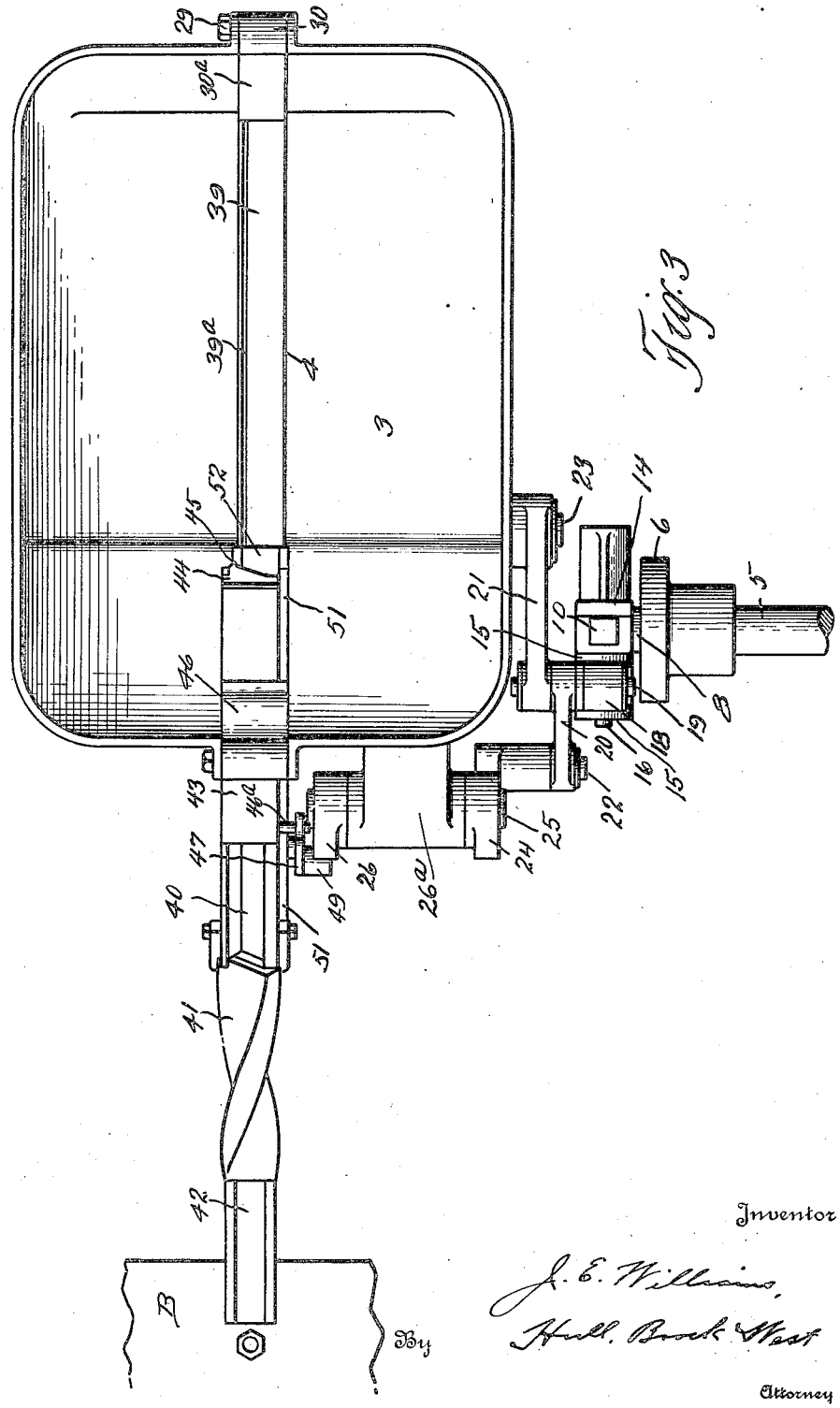
Figure 4:
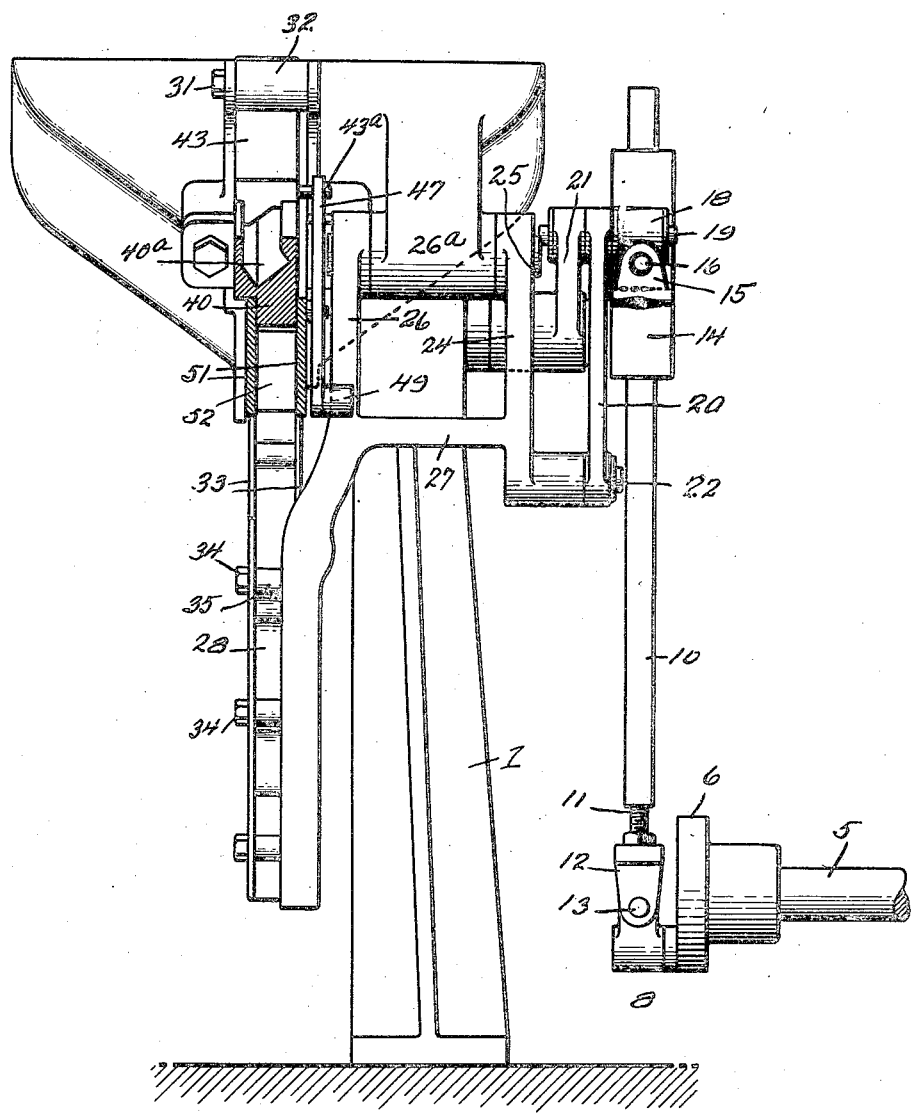

In the drawings, which show the preferred embodiment of my invention Fig. 1 represents a side elevation of a hopper and the feeding mechanism, the pick-up mechanism being shown in initial or receiving position; Fig. 2 is a similar view showing the pick-up mechanism in its delivering or uppermost position; Fig. 3 is a plan view of the mechanism shown in Fig. 1; Fig. 4 is a sectional view on the line 4—4 of Fig. 1; Fig. 5 is a sectional detail through the adjacent portions of the pick-up bar and receiving chute, the parts being in the positions as shown in Fig. 2; Figs. 6 and 7 are sectional views corresponding respectively to the lines 6—6 and 7—7 of Fig. 1; Fig. 8 is a front elevation of the feed chute and kick-out device, showing a nut in proper position; Fig. 9 a view similar to Fig. 8, showing the same parts, but with a nut in improper position, ready to be kicked out; Fig. 10 a plan view; and Figs. 11 and 12 elevations of one of the crowned nuts on which the said mechanism operates.

Describing the parts by reference characters, 1 denotes a base to the top of which there is bolted a bracket 2, the said bracket carrying a hopper 3. The hopper is provided in its bottom with a slot 4. This slot is for the reception of an oscillating pick-up device which will be described hereinafter. 5 denotes a power shaft which is provided with a crank disk 6 and a crank pin 7. Mounted on the crank pin is a sleeve 8 having a sleeve 9 extending at right angles to the crank pin. 10 denotes a connecting rod which is adjustably connected to the crank pin by means of a threaded extension 11 at its lower end which extension carries a clevis 12 connected to the sleeve 9 by means of a pin 13. The parts 8, 9, 12 and 13 provide a universal-joint style of connection between the crank pin 7 and the connecting rod 10. Secured to the upper end of the connecting rod 10 is a frame 14 having at one side thereof a pair of upwardly extending lugs 15 which receive a pivot pin 16 on which is journaled a sleeve 17 having at its upper end a sleeve 18 arranged at right angles thereto. The sleeve 18 receives a stud shaft 19 on which are sleeved one end of each of the arms 20 and 21, the opposite end of the arm 20 being sleeved upon a stud 22 and the opposite end of the arm 21 being sleeved upon a stud 23 which projects from the bracket 2. The stud 22 is carried by the lower end of a bracket arm 24, the upper end of which arm is pivotally supported by a stud 25 mounted in a bracket arm 26ª. The bracket arm 24 is part of a bracket frame comprising the said arm and an arm 26 pivoted to the opposite end of the stud 25, with a connecting member 27, the parts 24, 26 and 27 being substantially U-shaped. From these parts an arm 28 extends downwardly and is connected to the bottom of the pick-up device, which will now be described in connection with the corresponding details of the hopper.

The hopper is conveniently made of two halves having spacers interposed between said halves at the front and the rear of the hopper, the said spacers providing the slot 4 in the bottom of the hopper. For convenience of description, it will be assumed that the end of the hopper from which the nuts are delivered is the front end and the opposite end the rear end. The rear ends of the halves of the hopper are bolted together, as indicated at 29, there being a spacer 30 interposed between the flanges by which this bolting is effected. It will be noted from Fig. 1 that the front wall 30ª of this spacer is curved on an arc described from the stud shaft 25 as a center, the said stud shaft also being the center for the pick-up device, which will be described hereinafter. The front ends of the halves of the hopper are bolted together at their upper ends, as shown at 31, through an interposed spacer 32. The remaining space between the front ends of the hopper sections is closed in a manner to be described hereinafter.

33 denotes a pair of plates which are connected at their rear ends by bolts 34 and interposed spacers 35, one of the plates being carried by the arm 28. These plates are segmental in shape, being wide at their rear ends and narrowing toward their front ends and having their rear edges secured together by bolts 36 and an interposed spacer 37.

The front and rear edges of the plates 33 are curved on arcs described from the stud shaft 25 as a center, and their function is to constitute a downward extension of the pick-up bar which will close the slot 4 against the passage of nuts therethrough when the pick-up bar (to be referred to hereinafter) which is carried by these plates is moved upwardly to its delivering position. The said pick-up bar is shown at 38 and has its upper surface inclined downwardly from one lateral edge toward the other as shown at 39, said surface being provided adjacent its lower end with a stop 39ª adapted to prevent certain of the nuts from sliding off the surface when the bar is projected above the slot 4.

When the bar is in the upper or delivering position, shown in Fig. 2, its front end registers with a chute 40 which extends from the front of the hopper to a reversing chute 41 by which the nuts are delivered in turn into a chute 42 and thence into a finishing machine, a portion of which is indicated at B. The chute 40 has an inclined channel 40ª in the top thereof, the bottom of the channel being inclined to correspond to the inclination of the surface 39 of the pick-up bar. Slidably mounted on top of the chute 40 is a bar 43, the said bar having secured to its rear end a kick-out block 44, said block having a finger 45 which projects into the lower side of the channel 40ª, the finger having beveled surfaces 45ª and 45ᵇ, the bevel on these surfaces corresponding respectively to the inclination of the wall 40ᵇ of the channel and to the inclination of the side of the crown A′ of the crown nut A.

The bar 43 reciprocates beneath a cover plate 46, which is shown as having its upper end wrapped about the spacer 32 between the upper front ends of the hopper sections. The bar 43 is reciprocated by a lever 47 which is pivoted at 48, the connection between the bar 43 and the lever 47 being effected by a pin 43ª on the bar and a slot 47ª in the upper end of the lever. The opposite end of the lever is provided with a roller 49 which engages the front and lower surface of the arm 26, being held in engagement with said arm by a coil spring 50 connected at one end to the lever 47 between the pivot 48 and roller 49 and at its other end to one of the side plates 51 which extend forwardly and downwardly from the front end of the hopper and which constitute a forward extension of the same.

The rear ends of the plates 51 are curved on an arc described from the stud 25 as a center and the space between such rear ends is closed by a correspondingly curved transverse plate 52 fitted therebetween. These plates serve as lower spacing means between the front edges of the hopper sections and also constitute in effect forward extensions of the plates 33, the curved front ends of the plates 33 being substantially in engagement with the curved front ends of the plates 51 and with the plate 52.

The pivot 48 is carried by one of the plates 51; and the two plates form a support for the chute 40 (see Figs. 4 and 7), the chute being provided with a downward extension 40ᵇ fitting between the upper edges of the plates and being secured thereto, as by screws 53.

The nuts to be fed to the finishing machine having been dumped into the hopper, the shaft 5 is rotated and, through the crank disk 6, connecting rod 10, and link 20, swings the arm 28 upwardly, moving the pick-up bar 38 through the nuts in the hopper. The link 21 forms a rocking guide for the upper end of the rod 10 as the latter is operated by the crank pin 7. A certain number of the nuts in the hopper will be picked up by the bar 38 as it swings through the hopper, the nuts which rest with their crowns up being retained thereon by the stop shoulder 39ª. When in the elevated position shown in Fig. 2, the front or delivery end of the bar registers with the chute 40, and the nuts slide into and along said chute and are delivered by the reversing chute 41 and the chute 42 to the finishing machine, a portion of which is indicated at B.

It is essential that the nuts be delivered into the chute 40 with their crowned ends up. Therefore, any nuts that are delivered in reversed position will be kicked out of the upper end of the chute 40 and into the hopper by the finger 45 on the kick-out block 44. As the pick-up bar, with its slot-closing extensions 33, 33 moves upwardly, the spring 50 causes the lever 47 to rock upon its pivot 48, holding the roller 49 in engagement with the arm 28. This moves the bar 43 forwardly and downwardly, so that the block 44 is above and between the ends of the chute 40. When the bar 38 and the extensions 33, 33 thereof are moved downwardly by further rotation of the shaft 5, the arm 28 rocks the lower end of the lever 47 forwardly, thrusting the block 43 rearwardly. Any nuts that are in their proper position in the chute 40 will not be engaged by the finger 45, as will be obvious from an inspection of Figs. 8 and 9, but will be free to be delivered from said chute to the machine, indicated at B. However, should any nut or nuts be inverted, the one which is nearest to the finger 45 will be engaged thereby, as shown in Fig. 9, and it, together with any other nuts which may be in the rearwardly extending portion of the chute 40, will be ejected from such chute and into the hopper 3. While it may happen that, in operation, a certain number of the rearward movements of the kick-out bar will result in emptying the upper portion of the chute 40, the feeding mechanism operates at such speed as to ensure the delivery of a sufficient number of nuts in proper position to said chute to more than accommodate the required rate of delivery of nuts from said chute to the finishing machine.

Reference has been made hereinbefore to the fact that the bar 38 is provided with an inclined surface 39 and a stop 39ᵃ. It will be noted that this stop projects only a short distance above the surface 39. This results in the bar retaining thereon practically all of the nuts that may be delivered with their crowns up and in shedding into the hopper the great majority of nuts that may be delivered on such bar with their crowns down, the beveled surfaces of the crowns of the nuts facilitating their discharge over the stop. However, some nuts delivered crowns down upon the bar 38 will not be shed therefrom into the hopper, and these nuts will be delivered onto the inclined surface 40ᵃ of the chute 40, it being noted that the inclination of this surface is substantially the same as the inclination of the upper surface 39 of the pick-up bar. Through the combination of the pick-up bar having the beveled surface and the stop 39ᵃ and the chute 40 with the reciprocating kicker bar, it is possible to deliver the nuts in proper position with sufficient rapidity to the finishing machine. This is due to the fact that a minimum number of nuts will be delivered with the crowns down to the chute 40, with the result that a corresponding minimum number of nuts will be removed from said chute into the hopper by the kicker bar.

Having thus described my invention, what I claim is:

1. In a machine for selectively feeding crowned nuts and comprising a hopper and a chute leading from said hopper with means for delivering nuts from the hopper to the chute, reciprocable means for removing from the chute nuts improperly positioned therein, the said means comprising a finger projecting into the chute and adapted to engage only the upper portion of a nut improperly positioned therein while passing over the upper portions of nuts which are properly positioned therein.

2. In a machine for selectively feeding crowned nuts and comprising a hopper and a chute leading from said hopper with means for delivering nuts from the hopper to the chute, reciprocable means for removing from the chute nuts improperly positioned therein, the said means comprising a finger projecting into the chute at one side thereof, the finger being of such length and so positioned as to extend into the angle formed by and between the crown of a nut and the adjacent side of the chute, the said finger being so shaped as to clear the said crown and the length of the finger being such as to engage the side of a nut which is presented bottom up in said chute.

3. In a machine of the character described, the combination of a hopper having a slot in the bottom thereof, a chute extending from said hopper, a pick-up device for nuts oscillably mounted in the said slot and adapted to lift nuts from the hopper and to deliver them longitudinally of itself into said chute, a nut-reversing chute at the lower end of the former chute, and a reciprocating device arranged above the first mentioned chute and provided with a finger having an inclined surface adapted to ride over but without engaging the crowns of nuts presented upwardly in said chute and adapted to engage the sides of nuts delivered bottom side upward to said chute thereby to kick from the said chute into said hopper nuts so improperly delivered to said chute.

4. In a machine for selectively feeding nuts, the combination of a hopper having a slot in the bottom thereof and a chute extending from said slot, a pick-up device reciprocably mounted in said slot, the said device comprising a pick-up bar having its upper nut supporting surface inclined downwardly from one side to the other thereof and provided above the bottom thereof with a seat, and means for reciprocating the said bar within the hopper and into and out of operative relation to the said chute, the said bar being provided with an extension adapted to close the slot in the hopper when the bar is above such slot, and the said chute also having a nut-supporting surface which is inclined downwardly from one side to the other and provided at its lower end with a supporting wall for the sides of the nuts delivered thereto.

5. In a machine for selectively feeding crowned nuts comprising a hopper and a chute leading from said hopper with means for delivering nuts from the hopper to the chute, reciprocable means for removing from the chute nuts improperly positioned therein, the said means comprising a projection adapted and arranged to pass in proximity to and at one side of the crowned portions of nuts positioned upon said chute with their crowns presented upwardly, but adapted and arranged to engage nuts that may be positioned on said chute with their crowns presented downwardly.

6. In a machine for selectively feeding nuts, the combination of a hopper having a slot in the bottom thereof and a chute extending from said slot, a pick-up device reciprocably mounted in said slot, the said device comprising a pick-up bar having its upper nut-supporting surface inclined downwardly from one side to the other thereof and provided above the bottom thereof with a seat projecting a short distance above such upper nut-supporting surface, and means for reciprocating the said bar within the hopper and into and out of operative relation to the said chute, the said bar being provided with a downward extension adapted to close the slot in the hopper when the bar is above such slot, and the said chute also having a nut-supporting surface which is inclined downwardly from one side to the other and provided at its lower end with a supporting wall for the sides of the nuts delivered thereto.

7. In a machine for selectively feeding nuts, the combination of a hopper having a slot in the bottom thereof and a chute extending therefrom, a pick-up device reciprocably mounted in said slot, the said device comprising a pick-up bar having its upper nut-supporting surface inclined downwardly from one side to the other thereof and provided adjacent to the bottom thereof with a seat projecting a short distance above such nut-supporting surface, and means for reciprocating the said bar within the hopper and into and out of operative relation to the said chute.

8. In a machine for selectively feeding nuts, the combination of a hopper having a slot in the bottom thereof and a chute extending therefrom, a pick-up device reciprocably mounted in said slot, the said device comprising a pick-up bar having its upper nut-supporting surface inclined downwardly from one side to the other thereof and provided adjacent to the bottom thereof with a seat projecting a short distance above such nut-supporting surface, means for reciprocating the said bar within the hopper and into and out of operative relation to the said chute, and reciprocable means for removing from the chute nuts improperly delivered thereinto from said bar.

9. In a machine for selectively feeding crowned nuts, the combination of a hopper having a slot in the bottom thereof and a chute extending therefrom, a pick-up device reciprocably mounted in said slot, the said device comprising a pick-up bar having its upper nut-supporting surface inclined downwardly from one side to the other thereof and provided adjacent to the bottom thereof with a seat projecting a short distance above such nut-supporting surface, means for reciprocating the said bar within the hopper and into and out of operative relation to the said chute, and reciprocable means for removing from the chute nuts improperly delivered thereinto from said bar with their crowns down, the said means comprising a finger projecting into the chute and adapted to engage only a nut positioned thereon with its crown down while passing over nuts which are positioned thereon with their crowns up.

In testimony whereof, I hereunto affix my signature.

JULIUS E. WILLIAMS.